Oct. 16, 1956  R. J. VAN DE GRAAFF  2,767,324
APPARATUS FOR NEUTRON DETECTION
Filed June 26, 1953  2 Sheets-Sheet 1

INVENTOR Robert J. Van de Graaff
BY
Emery, Booth, Townsend, Miller and _____ ATTYS

United States Patent Office 2,767,324
Patented Oct. 16, 1956

2,767,324

APPARATUS FOR NEUTRON DETECTION

Robert J. Van de Graaff, Belmont, Mass., assignor to High Voltage Engineering Corporation, Cambridge, Mass., a corporation of Massachusetts Application June 26, 1953, Serial No. 364,400

11 Claims. (Cl. 250—83.1)

This invention relates to the detection of neutrons, and in particular to apparatus for the detection of a repeated time distribution of neutrons by converting said repeated time distribution of neutrons into a synchronously repeated space distribution of electrons, and detecting said space distribution of electrons.

It is desired to know neutron cross-sections for various nuclei as a function of neutron energy. In particular, one wants to know neutron cross-sections for elastic and inelastic scattering. This is done by bombarding a sample material with a known quantity of monoenergetic neutrons of known energy and detecting the quantity and energy of the scattered neutrons. The quantity and, more especially, the energy of the scattered neutrons is difficult to determine, because neutrons have no charge.

Figure 1:
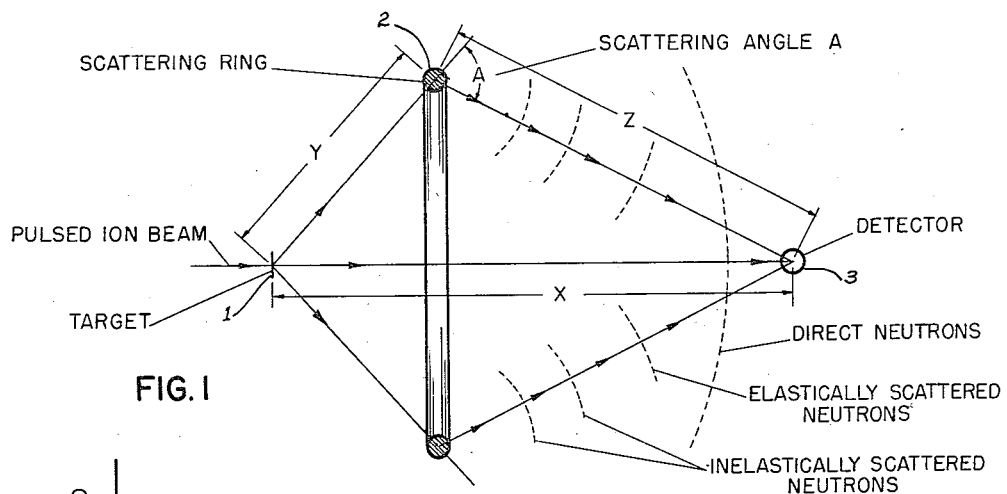
Fig. 1 is a diagram illustrating a possible arrangement of apparatus for conducting experiments to determine nuclear cross-sections for neutron scattering.

A possible technique is "time-of-flight," illustrated in Fig. 1. A pulse of monoenergetic neutrons is produced at 1, as by bombarding a tritium-zirconium or tritium gas target with a pulse of monoenergetic positive ions. The intensity $I_o$ of the pulse and the velocity $V_o$ of the neutrons can be ascertained. The neutron source 1 is placed axially with respect to a ring 2 of sample material, and a neutron detector 3 is axially placed opposite the neutron source 1. The neutrons emitted from the source 1 give rise to a series of neutron pulses at the detector 3. The first pulse is due to those neutrons which travel directly from the source 1 to the detector 3. The second pulse is due to those neutrons which are elastically scattered by the ring 2 through an angle A. The remaining pulses are due to those neutrons which are inelastically scattered by the ring 2 through the angle A. The inelastically scattered neutrons arrive at the detector 3 later than the elastically scattered neutrons because they have lost energy and are slower than the higher-energy (and therefore faster) elastically scattered neutrons. These pulses are indicated in the graph of Fig. 2.

The detector 3 must be capable of recording the intensity $I$ of each pulse and the time of arrival $t$ of each pulse at the detector 3. The intensity $I$ is a measure of the number of neutrons in a pulse, and the time of arrival $t$ is a measure of the energy of the neutrons in the pulse.

Figure 2:
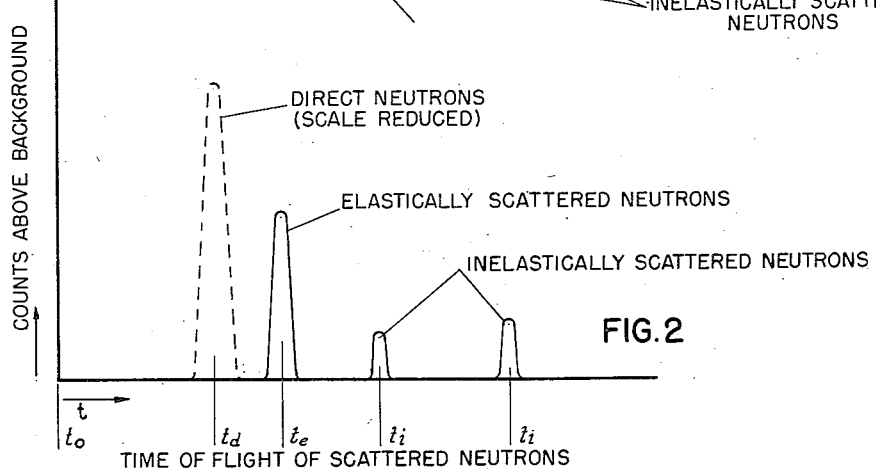
Fig. 2 is a graph wherein the intensity of a series of neutron pulses is plotted as a function of the time-of-flight of the neutrons.

Referring to Fig. 2, let the time of arrival of the first pulse be $t_d$. Then the time of departure $t_o$ of the neutrons from the source 1 is given by the equation $$t_o = t_d - \frac{X}{v_o}$$

since $t_d$, X and $v_o$ are known quantities.

Let the time of arrival of the second pulse be $t_e$. Then the velocity $v_e$ of the elastically scattered neutrons, and hence their energy, is given by the equation $$t_e - t_o = \frac{Y}{v_o} + \frac{Z}{v_e}$$

since $t_e$, $t_o$, Y, $v_o$ and Z are known quantities.

The energy of the inelastically scattered neutrons may be determined in the same fashion.

It will readily be apparent that two requirements are imposed upon the detector. First, it must give a reasonably accurate measurement of the intensity in each pulse. This is difficult, because each pulse is of such extremely short duration. Second, the detector must be able to discriminate between pulses. This is also difficult, because the series of pulses arrive in very rapid succession. My invention overcomes these difficulties and provides a detector which satisfies the above requirements.

Figure 3:
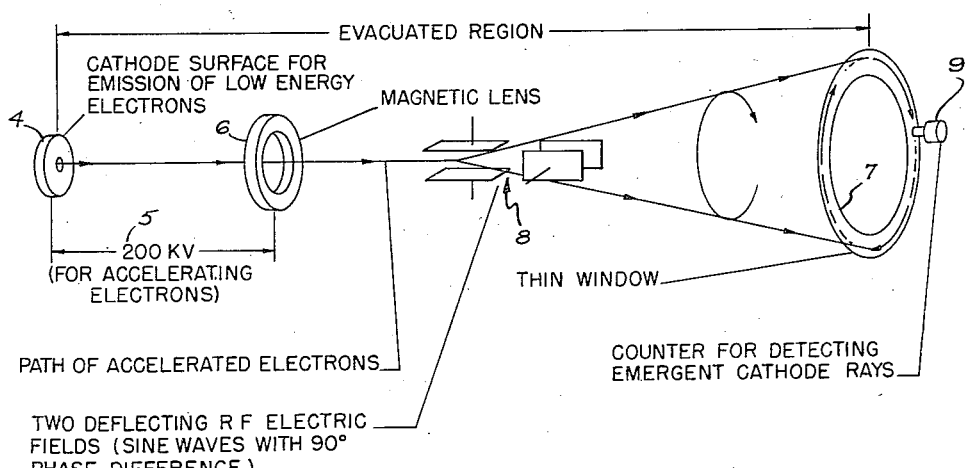
Fig. 3 is a diagram illustrating the essential components of one embodiment of apparatus for practising my invention.

The detector of my invention includes a high-voltage cathode-ray tube of more or less conventional design, the important features of which are shown in Fig. 3. Electrons emitted at the cathode 4 are accelerated by a high-voltage means 5, focused (as by a conventional magnetic lens 6), and deflected onto a target area 7 by an oscillating electric field produced by conventional means 8. The electron current impinging upon any small part of the target area 7 is measured by a suitable counter 9. In Fig. 3 the target area 7 is a thin annular electron window; and counters, such as that shown at 9, are positioned outside the window to measure the electron current through any desired part of the annular window 7. The entire volume of the cathode-ray tube from the cathode 4 to the window 7 is, of course, evacuated.

The cathode 4 is so constructed that it emits electrons in a quantity which is related in a known manner to the quantity of neutrons impinging thereon. The permissible variation in the time delay between the arrival of neutrons at and the emission of electrons from the cathode 4 is determined by the nature of the data desired. In general, the cathode 4 must provide the most copious supply of electrons from neutron bombardment consistent with minimum variation in emission time delay.

One method of causing neutrons to emit electrons from the cathode is similar to that used in conventional scintillation neutron counters, where the neutrons produce, either by nuclear disintegration or by recoil, high speed positive ions. These then produce photons which in turn emit electrons from the cathode. This method gives a high electron yield.

Another method is to use more directly the high speed positive ions produced by the neutrons, either by nuclear disintegration, or recoil. Some of these positive ions originate just under the cathode and have sufficient range to pass through it, each then causing the emission of a number of secondary electrons. Although this method has a low yield, it has the advantage of being much faster than the scintillation method, since electron emission is caused much more directly by the Coulomb force of the positive ion. This method is thus of special interest with regard to the possibility of attaining extremely short resolving times in detection.

Thus it can be seen that this invention can be used for the fast detection of positive ions as well as neutrons. For example, an alpha particle falling on the cathode surface would produce a pulse of the order of ten secondary electrons, the exact yield depending on the nature of the surface and other factors.

When the detector shown in Fig. 3 is used in conjunction with the arrangement shown in Fig. 1, the cathode 4 is positioned at the point 3 in said Fig. 1. Thus, although there will be an occasional flow of electrons in the cathode-ray tube, owing to background radiation, the arrival of a neutron pulse at the cathode 4 produces an adequately defined electron pulse.

The neutron source 1 of Fig. 1 is caused to produce a continuous sequence of neutron pulses, as by repeatedly bombarding a suitable target with a pulsed ion beam at a constant radio-frequency $f$. Thus a continuous sequence of neutron-pulse groups, of the type shown in the graph of Fig. 2, arrives at the cathode 4.

The oscillatory electric field 8 (see Fig. 3) of the cathode-ray tube is synchronized with the ion bombardment, by conventional means well known in the art, so that it oscillates at the same frequency $f$. The oscillation is not limited to any particular pattern, but in Fig. 3 it is shown as circular, so that the intersection of the electron beam with the window 7 rotates about the annular window 7 at constant velocity. Thus, any given pulse in the neutron-pulse group, such as the first pulse shown in the graph of Fig. 2, will produce an electron pulse which always passes through the same part of the window 7 for each neutron-pulse group. A counter placed at that part of the window 7 will therefore receive all such pulses, and the intensity of the corresponding neutron pulse can be measured.

Moreover, no other pulse in the neutron-pulse group will be recorded by that counter unless its time of arrival at the cathode 4 differs from that of the recorded pulse by an integral multiple of $1/f$.

Since the time of neutron flight is determined by the position of the counter, the position of even a slow counter can give a well-resolved determination of the time of neutron flight.

Figure 4:
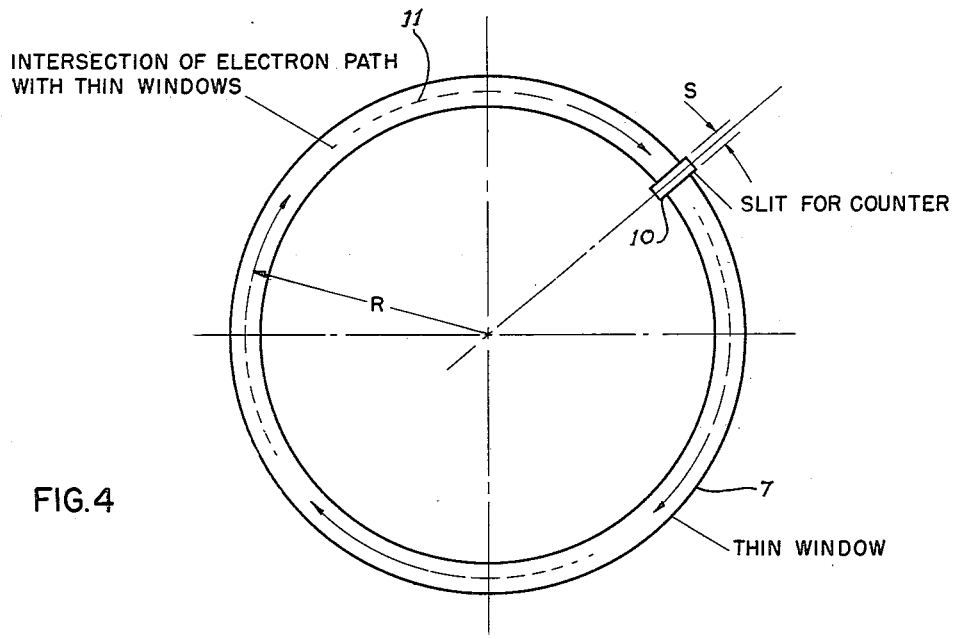
Fig. 4 is a diagram in plan view of a portion of the apparatus of Fig. 3.

The resolution of the detector shown in Fig. 3 may be illustrated by reference to Fig. 4, wherein the target area 7 is shown in plan view. The counter 9 records the electrons which pass through a sensitive area in the face of the counter, such as the aperture at 10. Let the width of the aperture 10 be $s$. The intersection of the electron paths with the annular window 7 is indicated by the broken arrows 11. If the radius of the circle defined by the arrows 11 is R, then the point of intersection of the electron paths with the window 7 moves with a linear velocity $v=2\pi Rf$. Thus the circumferential distance $s$ corresponds to a time interval $t=s/v=s/2\pi Rf$, so that the counter is sensitive only during the time interval $t$. It is evident that this time interval $t$ can be made extremely short. For example, if $s=4$ mm., $2\pi R=1$ meter, and $f=2\times 10^7$ C. P. S., then $t=2\times 10^{-10}$ sec.

Let it now be supposed that a considerable number of separate detectors each of width $s$ is placed around the thin annular window. If $n$ is the limiting number of these detectors for which there is space around the circumference, then $$n=\frac{2\pi R}{s}$$

Assuming the values for R and $s$ given above, $n=250$.

In this way data can be obtained by the operation of a large number of detectors in parallel. Thus experimental research can be speeded up, or alternatively the demands for high neutron intensity reduced.

Since it is desirable to have $t$ small and $n$ large, it is evident from the expressions just given for these quantities that $s$ should be small and R and $f$ large. This demands very accurate focusing of the accelerated electrons, which should therefore be very homogeneous in energy. Since the electrons are necessarily emitted from the cathode with an extremely broad distribution in energy and angle it is evident that the higher the constant voltage used for their acceleration, the more homogeneous in energy and angle the resultant electrons will be. This is one reason why a relatively high accelerating voltage, for example, 100 to 200 kv., is desirable.

Other advantages of the use of high voltage are as follows:

(1) The high speed attained by the electrons is desirable for short time resolution.

(2) The electrons gain sufficient energy for window penetration without excessive energy loss and scattering.

(3) Each electron is given a large and constant amount of energy, which facilitates its detection and recording.

Figure 5:
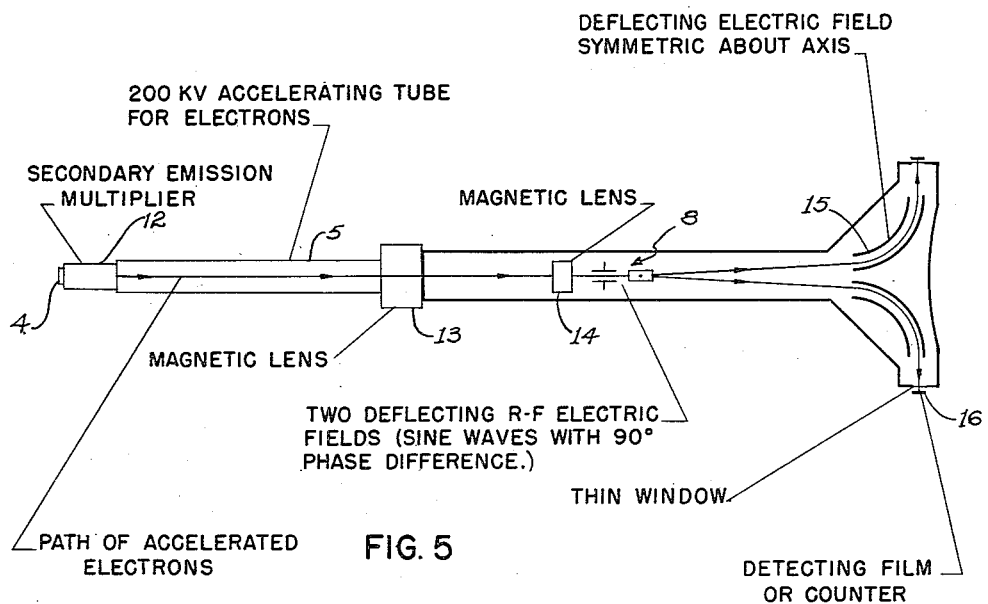
Fig. 5 is a diagram illustrating another embodiment of apparatus for practising my invention.

An alternative embodiment of apparatus for practicing my invention is illustrated in Fig. 5. The apparatus shown in said Fig. 5 is a substitute for that shown in Fig. 3, and when used in conjunction with the arrangement of Fig. 1, the cathode 4 is positioned at the point 3 in said Fig. 1. In said Fig. 5, a secondary emission electron multipler 12 is provided to increase the electron current, and two magnetic lenses 13, 14 are provided to improve the focus of the electron beam. A deflecting electric field at 15 of constant intensity and symmetric about the axis of the cathode-ray tube deflects the electrons radially outward onto an anular strip of film 16, which constitutes the target area. This film may be successively exposed across its width for each new parameter by traversing along the axis of the cathode-ray tube. The amount of data which may thus be recorded is very great indeed. It is a permanent record, and can be analyzed by a team entirely separately from the day-to-day running of the particle accelerator which is used to create the neutrons.

Having thus disclosed my invention and several illustrative embodiments thereof, it is to be understood that although specific terms are employed, they are used in a generic and descriptive sense, and not for purposes of limitation, the scope of the invention being set forth in the following claims.

I claim:

1. Apparatus for detecting a repeated time distribution of neutrons comprising, in combination, means for converting said repeated time distribution of neutrons into a synchronously repeated space distribution of electrons, and means for detecting said space distribution of electrons.

2. Apparatus for detecting a repeated time distribution of neutrons comprising, in combination, means for converting said repeated time distribution of neutrons into a functionally related time distribtuion of electrons; means for deflecting said electrons in synchronism with the repetition of said time distribution of neutrons, whereby said repeated time distribution of neutrons is converted into a synchronously repeated space distribution of electrons; and means for detecting said space distribution of electrons.

3. Apparatus for detecting a repeated time distribution of neutrons, comprising in combination, cathode means supported in the path of said repeated time distribution of neutrons, said cathode means being adapted to emit electrons in quantities which are functionally related to the intensity of neutrons bombarding said cathode means, means to accelerate said electrons, means to deflect said electrons in a direction which varies cyclically in synchronism with the repetition of the time distribution of neutrons, and electron-sensitive detecting means supported in the path of at least some of the deflected electrons.

4. Apparatus for detecting a repeated time distribution of neutrons, comprising in combination, cathode means supported in the path of said repeated time distribution of neutrons, said cathode means being adapted to emit electrons in quantities which are functionally related to the intensity of neutrons bombarding said cathode means, means to accelerate said electrons, means to deflect said electrons in a direction which varies cyclically in synchronism with the repetition of the time distribution of neutrons, and at least one counter having a sensitive area which is supported in the path of some of the deflected electrons, whereby said counter detects those electrons only which are deflected onto said sensitive area.

5. Apparatus for detecting a repeated time distribution of neutrons, comprising in combination, cathode means supported in the path of said repeated time distribution of neutrons, said cathode means being adapted to emit electrons in quantities which are functionally related to the intensity of neutrons bombarding said cathode means, means to accelerate said electrons, a target area, means to deflect said electrons onto said target area in such a manner that the intersection of the path of the deflected electrons with said target area repeatedly moves in a definite pattern in synchronism with the repetition of the time distribution of neutrons, and electron-sensitive detecting means supported to lie in the vicinity of said target area.

6. Apparatus for detecting a repeated time distribution of neutrons, comprising an evacuated cathode-ray tube having cathode means at one end portion thereof and an electron-permeable window at the opposite end portion thereof, said cathode means being adapted to emit electrons in quantities which are functionally related to the intensity of neutrons impinging thereon; means to accelerate and direct said electrons, whereby said electrons are caused to travel from said cathode means to said electron-permeable window as an electron beam, means to deflect said electron beam in such a manner that the intersection of said electron beam with said electron-permeable window repeatedly follows an annular path in synchronism with said repeated time distribution of neutrons; and means to detect the quantity of electrons passing through said electron-permeable window over at least one limited portion of said annular path.

7. Apparatus for detecting a repeated time distribution of neutrons, comprising an evacuated cathode-ray tube having cathode means at one end portion thereof and an annular electron-permeable window at the opposite end portion thereof, said cathode means being adapted to emit electrons in quantities which are functionally related to the intensity of neutrons impinging thereon; means to accelerate and direct said electrons so as to form an electron beam; means to deflect said electron beam radially outward onto said anular window; means to deflect said electron beam in such a manner that the intersection of said electron beam with said annular window repeatedly follows an annular path in synchronism with said repeated time distribution of neutrons; and film means to detect the quantity of electrons passing through said annular window as a function of position on said annular path.

8. Apparatus in accordance with claim 7, wherein said film means is movable in a direction substantially parallel to the longitudinal axis of said cathode-ray tube.

9. Apparatus for detecting a repeated time distribution of positive ions comprising, in combination, means for converting said repeated time distribution of positive ions into a functionally related time distribution of electrons; means for deflecting said electrons in synchronism with the repetition of said time distribution of positive ions, whereby said repeated time distribution of positive ions is converted into a synchronously repeated space distribution of electrons; and means for detecting said space distribution of electrons.

10. Apparatus for detecting a repeated time distribution of positive ions, comprising in combination, cathode means supported in the path of said repeated time distribution of positive ions, said cathode means being adapted to emit electrons in quantities which are functionally related to the intensity of positive ions bombarding said cathode means, means to accelerate said electrons, a target area, means to deflect said electrons onto said target area in such a manner that the intersection of the path of the deflected electrons with said target area repeatedly moves in a definite pattern in synchronism with the repetition of the time distribution of positive ions, and electron-sensitive detecting means supported to lie in the vicinity of said target area.

11. Apparatus for detecting a repeated time distribution of positive ions, comprising an evacuated cathode-ray tube having cathode means at one end portion thereof and an annular electron-permeable window at the opposite end portion thereof, said cathode means being adapted to emit electrons in quantities which are functionally related to the intensity of positive ions impinging thereon; means to accelerate and direct said electrons so as to form an electron beam; means to deflect said electron beam radially outward onto said annular window; means to deflect said electron beam in such a manner that the intersection of said electron beam with said annular window repeatedly follows an annular path in synchronism with said repeated time distribution of positive ions; and film means to detect the quantity of electrons passing through said annular window as a function of position on said annular path.

References Cited in the file of this patent
UNITED STATES PATENTS

| 2,270,373 | Kallmann et al. | Jan. 20, 1942 |
| 2,555,423 | Sheldon | June 5, 1951 |
| 2,586,392 | Sheldon | Feb. 19, 1952 |